(No Model.)
J. MUNTON.
CAR WHEEL.
No. 319,837. Patented June 9, 1885.
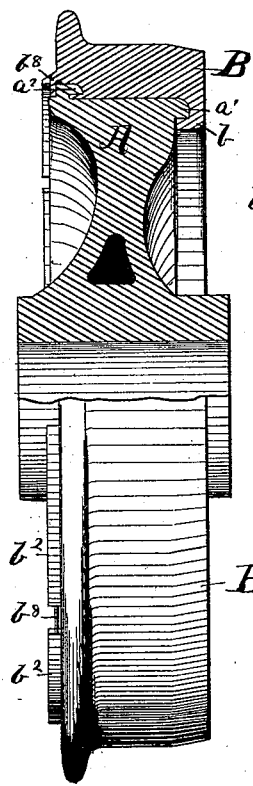
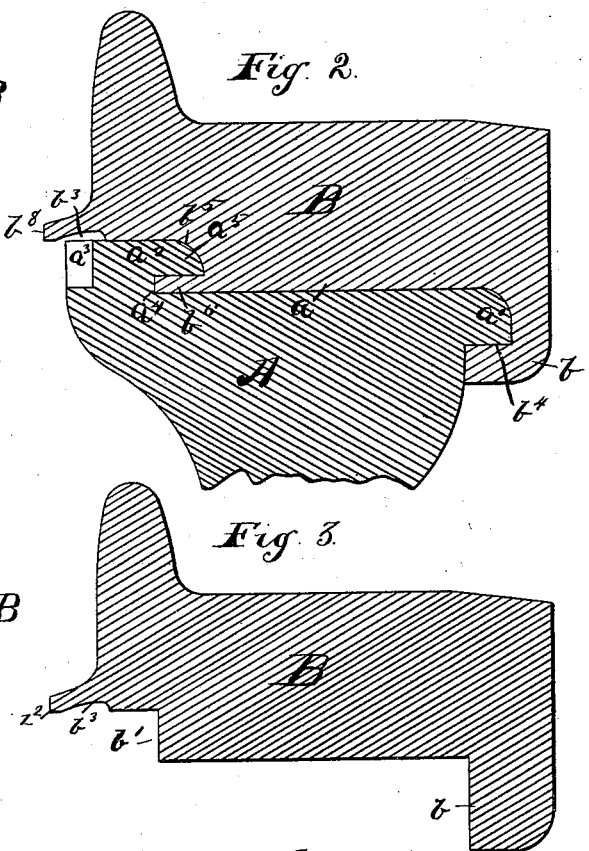
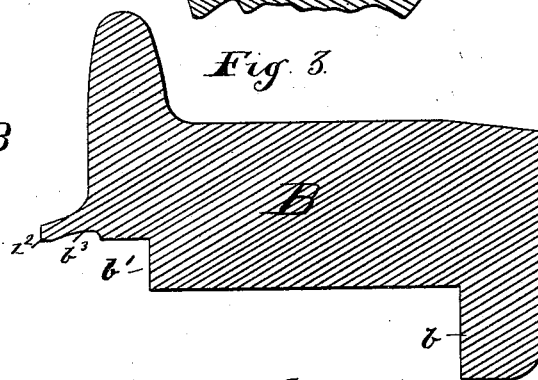
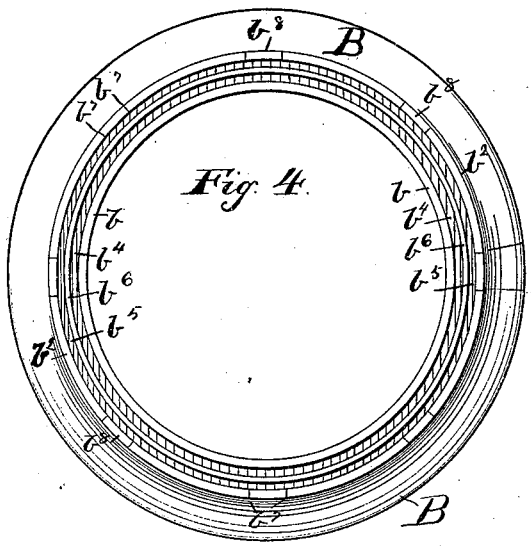
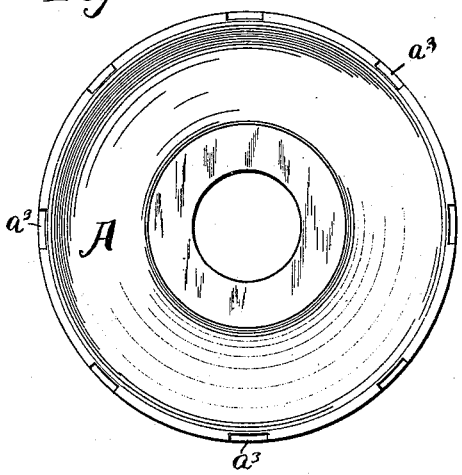
Witnesses:
Lew. E. Curtis.
H. M. Munday.
Inventor:
James Munton
By Munday, Evarts & Adcock
his Attorneys

United States Patent Office.

JAMES MUNTON, OF CHICAGO, ILLINOIS, ASSIGNOR TO THE MUNTON CAR WHEEL COMPANY, OF SAME PLACE.

CAR-WHEEL.

SPECIFICATION forming part of Letters Patent No. 319,837, dated June 9, 1835.

Application filed November 24, 1884. (No model.)

*To all whom it may concern:*

Be it known that I, JAMES MUNTON, a subject of the Queen of Great Britain, residing in Chicago, in the county of Cook and State of Illinois, have invented a new and useful Improvement in Car-Wheels and Manufacture of the Same, of which the following is a specification.

The present invention relates to car-wheels having steel tires.

The usual life or wear of a steel-tire car-wheel is ordinarily about four or five times that of the cast-iron wheel, but the principal objection or difficulty in their use heretofore has been, first, the liabilty of the wheel to utterly collapse if the tire happens to break, so that it can be no longer run, even for a short distance, and also, of course, endangering the car or the wrecking of a whole train perhaps in case of such accident; and, second, their expensiveness. By my invention I overcome both of these objections.

In the accompanying drawings, which form a part of this specification, and in which similar letters of reference indicate like parts, Figure 1 is a sectional view of a wheel embodying my invention, showing the lower half of the same in elevation. Fig. 2 is a section of the wheel showing the tire fitted upon the center before it is secured thereon. Fig. 3 shows a section of the tire as it is rolled and before being finished by turning or cutting the grooves therein. Fig. 4 is a plan view of the tire, and Fig. 5 is a plan view of the center.

In said drawings, A represents the center of the wheel, consisting of an old cast-iron car-wheel having its tread turned down square, as shown at $a$, to fit the interior of the tire, and provided with an annular projecting rim, $a'$, at one side and a radially-projecting rim or web, $a^2$, on its periphery at the opposite side or edge of the wheel. Notches or recesses $a^3$, preferably six or eight or more in number, and about two or three inches in length, are provided at intervals in this radially-projecting rim or web $a^2$. These recesses should have square or rectangular ends, as shown in Figs. 2 and 5. An annular groove, $a^4$, is also cut in the opposite side of this rim or web $a^2$, so as to form a horizontally-projecting annular rim, $a^5$, at the outer edge of the rim $a^2$.

Instead of making the center A out of an old worn-out wheel it may of course be specially cast in the desired form, as shown.

The steel tire B is rolled in the form shown in Fig. 3—that is to say, with a rim or web, $b$, projecting inwardly on its outer edge, and with an annular recess, $b'$, corresponding in depth with the rim or web $a^2$ on the center A. The tire is also rolled with a projecting annular web or rim, $b^2$, on its inner side, the inner surface of which web $b^2$ is provided with an annular curved groove or recess, $b^3$. After the tire is thus rolled, an annular groove, $b^4$, corresponding to the rim $a'$ on the center, is next cut in the inner face of the rim or web $b$, and another annular groove, $b^5$ is cut in the vertical face of the recess $b'$, to fit the projecting rim $a^5$ on the center, and thus also forming a projecting rim, $b^6$, that fits in the groove $a^4$ on the center. The tire is next forced or shrunk upon the center, and then the web $b^2$ is cut, as shown at $b^7$ $b^7$, thus forming the lips $b^8$, which are then hammered down into the corresponding recesses $a^3$ on the center, thus firmly securing the tire on the center. By reason of the lips $b^8$ fitting in the recesses $a^3$ the tire will also be securely held from rotation on the center when brakes are applied, and thus prevented from getting loose. As different portions of the tire are separately secured to the center by means of the lips $b^8$ $b^8$ at different points and the interlocking grooves and rims on the tire and center, it is obvious that if the tire happens to break, even into a number of different pieces, they will still be secured to the center and still constitute a wheel that can be run a reasonable distance, and for the same reason no danger to the car or train will be occasioned by the breaking of the tire, as the wheel cannot collapse. As only a portion of the projecting web $b^2$ is used to form the lips $b^8$, when desired the tire can be removed from the center by simply cutting off these lips, and then again replaced on the same or a different center by merely turning the tire into a slightly different position on the center and then forming new lips $b^8$ out of other portions of the said web or rim $b^2$.

In my wheel, also, after the steel tire is worn out, the center still remains good and can be used again and again with new tires, which is not the case where bolts or like devices are employed to secure the tire and central portion of the wheel together, as the parts cannot be so accurately fitted as to cause the old bolt-holes and fastening devices to come in the right place and register with each other.

The annular groove $b^3$ in the projecting web $b^2$ serves to render said web, or portions of it, more easily turned down into the recesses $a^3$, and to prevent the lips $b^8$ breaking off in the operation. The lips $b^8$ should be heated when they are hammered down.

I wish it to be understood that I do not herein claim, broadly, a car-wheel consisting of a center having a recessed edge or rim in combination with a tire having lips or portions of a projecting web turned down into said recessed edge or rim to prevent the tire slipping on the center, as that forms the subject of another application filed by me on the 5th day of January, 1885, and now pending in the Patent Office; but I herein claim such recessed edge or rim and turned-down lips only in connection with the interlocking rims and grooves on the center and tire, as herein described, and set forth in the claims; and for the same reason I do not herein claim the web $b^2$, provided with a groove, $b^3$, on the underside near its base, to facilitate its turning down in connection with the center having a recessed edge or rim, as that also forms part of said other pending application.

I claim—

1. The combination of center A, provided with projecting rims $a'$ and $a^2$, annular groove $a^4$, and recesses $a^3$, with tire B, having annular grooves $b^4$ and $b^5$, and rim $b^6$, interlocking with said rims and grooves on said center, and provided with lips $b^8$, fitting in said recesses $a^3$, substantially as described.

2. The combination of cast-iron center A with steel tire B, said center and tire being provided with interlocking annular rims and grooves, said center A having also recesses $a^3$, and said tire B having a projecting web, $b^2$, portions of which are turned down into said recesses $a^3$, substantially as specified.

JAMES MUNTON.

Witnesses:
EDMUND ADCOCK,
H. M. MUNDAY.